(12) United States Patent
Mehta et al.

(10) Patent No.: US 10,118,848 B2
(45) Date of Patent: Nov. 6, 2018

(54) INHIBITION OF SILICA SCALE USING AMINE-TERMINATED POLYOXYALKYLENE

(71) Applicants: Dow Global Technologies LLC, Midland, MI (US); Rohm and Haas Company, Philadelphia, PA (US)

(72) Inventors: Somil Chandrakant Mehta, Mumbai (IN); Alain DuFour, Pegomas (FR)

(73) Assignees: Dow Global Technologies LLC, Midland, MI (US); Rohm and Haas Company, Midland, MI (US)

( * ) Notice: Subject to any disclaimer, the term of this patent is extended or adjusted under 35 U.S.C. 154(b) by 81 days.

(21) Appl. No.: 15/316,322

(22) PCT Filed: Jun. 2, 2015

(86) PCT No.: PCT/US2015/033728
§ 371 (c)(1),
(2) Date: Dec. 6, 2016

(87) PCT Pub. No.: WO2015/195319
PCT Pub. Date: Dec. 23, 2015

(65) Prior Publication Data
US 2017/0197855 A1    Jul. 13, 2017

Related U.S. Application Data

(60) Provisional application No. 62/014,261, filed on Jun. 19, 2014.

(51) Int. Cl.
| | | |
|---|---|---|
| C02F 5/12 | (2006.01) |
| C02F 1/44 | (2006.01) |
| C08G 65/08 | (2006.01) |
| C02F 101/10 | (2006.01) |
| C02F 103/02 | (2006.01) |
| C02F 103/28 | (2006.01) |
| C02F 103/10 | (2006.01) |

(52) U.S. Cl.
CPC ............... *C02F 5/12* (2013.01); *C02F 1/441* (2013.01); *C08G 65/08* (2013.01); *C02F 2101/10* (2013.01); *C02F 2103/023* (2013.01); *C02F 2103/10* (2013.01); *C02F 2103/28* (2013.01); *C02F 2303/22* (2013.01); *C02F 2305/04* (2013.01)

(58) Field of Classification Search
None
See application file for complete search history.

(56) References Cited

U.S. PATENT DOCUMENTS

| | | | |
|---|---|---|---|
| 4,328,106 A | 5/1982 | Harrar et al. | |
| 4,510,059 A | 4/1985 | Amjad et al. | |
| 4,584,104 A | 4/1986 | Dubin | |
| 4,618,448 A | 10/1986 | Cha et al. | |
| 4,711,725 A | 12/1987 | Amick et al. | |
| 4,849,129 A | 7/1989 | Chen et al. | |
| 4,933,090 A | 6/1990 | Gill et al. | |
| 5,112,496 A | 5/1992 | Dhawan et al. | |
| 5,256,302 A | 10/1993 | Perez et al. | |
| 5,271,847 A | 12/1993 | Chen et al. | |
| 5,271,862 A | 12/1993 | Freese | |
| 5,422,010 A | 6/1995 | Carey et al. | |
| 5,510,059 A | 4/1996 | Yuki et al. | |
| 5,658,465 A | 8/1997 | Nicholas et al. | |
| 5,681,479 A | 10/1997 | Kerr et al. | |
| 6,017,994 A | 1/2000 | Carter et al. | |
| 6,051,056 A * | 4/2000 | Lassila | B01F 17/005 106/31.28 |
| 6,051,142 A | 4/2000 | Roe | |
| 6,077,440 A | 6/2000 | Roe et al. | |
| 6,153,106 A | 11/2000 | Kelley et al. | |
| 6,162,391 A | 12/2000 | Kowata et al. | |
| 6,444,747 B1 | 9/2002 | Chen et al. | |
| 6,641,754 B2 | 11/2003 | Buentello et al. | |
| 2004/0171786 A1* | 9/2004 | Klein | C08G 18/10 528/61 |
| 2011/0114564 A1 | 5/2011 | Amjad et al. | |
| 2012/0022192 A1 | 1/2012 | Nishida | |
| 2012/0161068 A1 | 6/2012 | Greene et al. | |

FOREIGN PATENT DOCUMENTS

| | | |
|---|---|---|
| JP | 2012149186 | 8/2012 |
| WO | 2002034681 | 3/2003 |

* cited by examiner

*Primary Examiner* — Krishnan S Menon
*Assistant Examiner* — Bradley R Spies

(57) ABSTRACT

A method for inhibiting silica scale formation in an aqueous system by adding an amine-terminated polyoxyalkylene anti-scalant to the water used in the aqueous system.

4 Claims, 1 Drawing Sheet

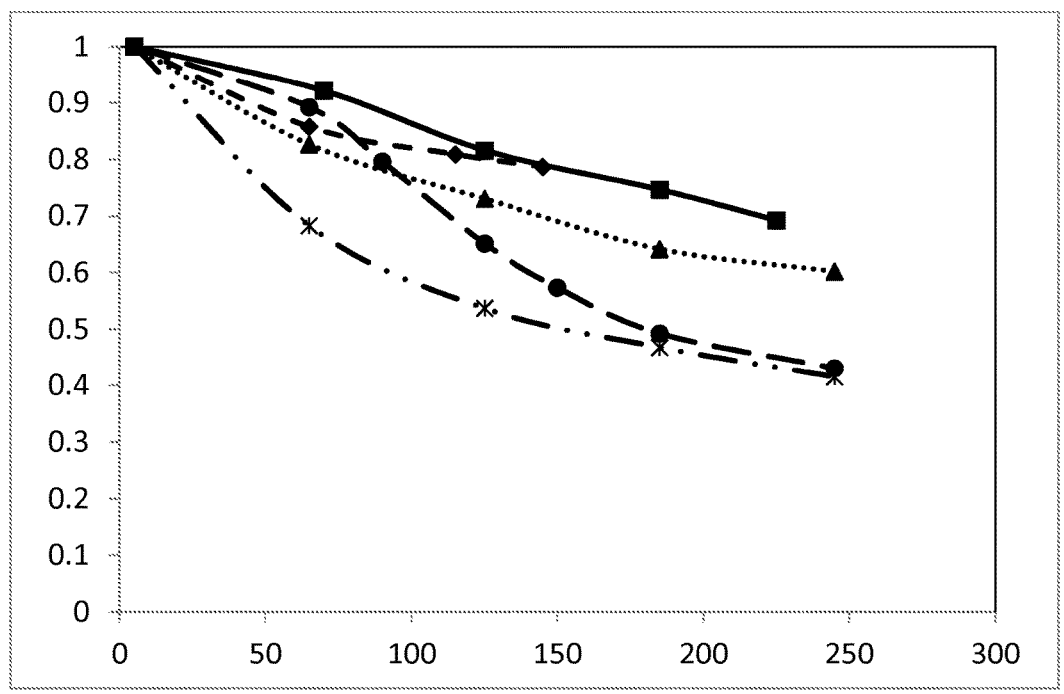

INHIBITION OF SILICA SCALE USING AMINE-TERMINATED POLYOXYALKYLENE

FIELD

The invention relates to reducing the formation of silica deposits in aqueous systems.

INTRODUCTION

Problems associated with the formation of silica scale in aqueous systems are well documented. Depending upon the pH, temperature, silica concentration and presence of salts and polyvalent metal ions in the feed water used in such systems, different types of silica precipitate ("scale") may form. For example at pH values above 9.5, silica scale is predominantly in the form of metal silicates, whereas colloidal silica (polymerized silica particles) is more common at pH values below 9.5. While generally soluble at concentrations up to 150 mg/L at 25° C. and pH 7.5, the presence of salts and polyvalent metal ions in the feed water can catalyze silica scale formation. Colloidal silica scaling (fouling) is particularly problematic in reverse osmosis systems where concentration polarization at the membrane surface further exacerbates silica scaling. As a consequence, RO systems are often operated at reduced recovery rates (e.g. below 75%) when treating feed waters containing more than 30 mg/l silica.

A variety of products have been promoted for reducing colloidal silica scale formation, e.g. polyacryl-amides, acrylic acid and maleic acid polymers and copolymers, phosphonates and polyphosphates (U.S. Pat. No. 4,933,090), boric acid (U.S. Pat. No. 4,584,104), and AQUAFEED™ Antiscalant and MT 5010 and MT 3100 cleaners available from the Lubrizol Company. Another class of anti-scalant is based upon polyalkoxylate or "polyoxyalkylene," e.g. ethylene oxide-propylene oxide copolymers as described in U.S. Pat. No. 6,051,142 and WO2002/34681. U.S. Pat. No. 6,017,994 and JP2012/149186 similarly describe polyoxyalkylene with terminal amides and pyrrolidone moieties, respectively. US2011/0114564 describes the use of alkoxylated amines reacted with acrylic acid or maleic acid polymers having pendant carboxylic acid groups. See also: U.S. Pat. No. 4,328,106, U.S. Pat. No. 4,510,059, U.S. Pat. No. 4,618,448, U.S. Pat. No. 4,711,725, U.S. Pat. No. 4,849,129, U.S. Pat. No. 5,256,302, U.S. Pat. No. 5,271,847, U.S. Pat. No. 5,271,862, U.S. Pat. No. 5,422,010, U.S. Pat. No. 5,510,059, U.S. Pat. No. 5,658,465, U.S. Pat. No. 5,681,479, U.S. Pat. No. 5,658,465, U.S. Pat. No. 6,077,440, U.S. Pat. No. 6,153,106, U.S. Pat. No. 6,162,391, U.S. Pat. No. 6,444,747, U.S. Pat. No. 6,641,754, US2012/0161068 and US2012/0022192. Despite the development of new anti-scalants, silica scaling continues to be a major challenge for aqueous systems and in particular, reverse osmosis systems.

SUMMARY

In one embodiment the invention includes a method for inhibiting silica scale formation in an aqueous system comprising adding an anti-scalant to water used in the aqueous system, wherein the anti-scalant comprises an amine-terminated polyoxyalkylene. In another embodiment, the aqueous system is a reverse osmosis system including a reverse osmosis membrane and the method involves adding the anti-scalant to a source of feed water, and passing the resulting feed water through the reverse osmosis system such that a portion passes through the reverse osmosis membrane to produce a permeate stream having a reduced concentration of silica with the remaining portion of feed water forming a reject stream having a higher concentration of silica. Additional embodiments are described.

BRIEF DESCRIPTION OF THE DRAWINGS

FIG. 1 is a plot of normalized permeate flux as a function of time for samples described in Example 2.

DETAILED DESCRIPTION

As used herein, the term "scale" in intended to refer to a solid precipitate without being limited by the underlying formation mechanism, e.g. coagulation, destabilization, polymerization, etc. The term "anti-scalant" refers to substance that inhibits (reduces) the formation of scale and/or the size and/or shape of solid particles. The scalant of particular focus is colloidal or "amorphous" silica.

The anti-scalants of the present invention include alkylene oxide polymers (also referred to as "polyoxyalkylene" or "polyalkyloxides") that include at least one terminal amine moiety (preferably secondary or tertiary amine). The polymers preferably have a Mw of 100 to 100,000 AMU (Daltons) but more preferably 1000 to 50,000 AMU (Daltons). The polymers are preferably non-ionic and water soluble, and may be branched or linear. The polymers preferably include at least 40 wt %, 50 wt %, 85 wt %, 90 wt % and in some embodiments even 95 wt % of alkylene oxide groups. The term "alkylene oxide" is used interchangeable with the term "oxyalkylene" and both collectively refer to units having the structure —(O-A)- wherein O-A represents the monomeric residue of the polymerization reaction product of a $C_{2-4}$ alkylene oxide. Examples include but are not limited to: oxyethylene with the structure —(OCH$_2$CH$_2$)—; oxypropylene with the structure —(OCH(CH$_3$)CH$_2$)—; oxytrimethylene with the structure —(OCH$_2$CH$_2$CH$_2$)—; and oxybutylene with the general structure —(OC$_4$H$_8$)—. The polyoxyalkylene units can be homopolymeric or copolymeric. Examples of homopolymers of polyoxyalkylenes include, but are not limited to polyoxyethylene, which contains units of oxyethylene; polyoxy propylene, which contains units of oxypropylene; polyoxytrimethylene, which contains units of oxytrimethylene; and polyoxybutylene, which contains units of oxybutylene. Examples of polyoxy butylene include a homopolymer containing units of 1,2-oxybutylene, —(OCH(C$_2$H$_5$)CH$_2$)—; and polytetrahydrofuran, a homopolymer containing units of 1,4-oxybutylene, —(OCH$_2$CH$_2$CH$_2$CH$_2$)—. Alternatively the polyoxyalkylene segments can be copolymeric, containing two or more different oxyalkylene units. The different oxyalkylene units can be arranged randomly to form a random polyoxyalkylene; or can be arranged in blocks to form a block polyoxyalkylene. Block polyoxyalkylene polymers have two or more neighboring polymer blocks, wherein each of the neighboring polymer blocks contain different oxyalkylene units, and each polymer block contains at least two of the same oxyalkylene units. Oxyethylene is the preferred oxyalkylene segment. Applicable polymers are represented by Formula 1.

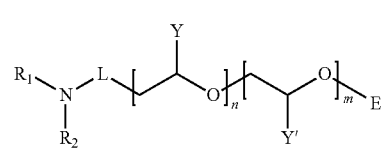

Formula 1 wherein Y and Y' are independently selected from hydrogen or an alkyl group preferably having from 1 to 3 carbon atoms (e.g. methyl); $R_1$ and $R_2$ are independently selected from hydrogen or a $C_1$ to $C_{20}$ hydrocarbon moiety, ($R_1$ is preferably selected from hydrogen or a $C_1$ to $C_{10}$ hydrocarbon moiety; $R_2$ is preferably selected from a $C_4$ to $C_{20}$ hydrocarbon moiety or more preferably a $C_{10}$ to $C_{14}$ hydrocarbon moiety); where the term "hydrocarbon moiety" includes aromatic and aliphatic groups (saturated or unsaturated) which may be substituted with hydrocarbon moieties); E is a terminal end group selected from hydrogen, a $C_1$ to $C_{20}$ hydrocarbon moiety (e.g. alkyl), or —$NR_1R_2$ as defined above (wherein the selection of $R_1$ and $R_2$ for each amine group is independent of other amine groups in the compound); L is a linking group selected from a direct bond between the oxyalkylene repeating unit —$(CH_2CH(Y)O)$— and the nitrogen atom, or a $C_1$ to $C_{20}$ hydrocarbon moiety (e.g. alkyl); n is an integer from 2 to 1000, preferably 5 to 100; and m is an integer from 0 to 1000. Preferred $R_1$ and $R_2$ groups include alkyl groups which may be branched or unbranched and which preferably include no other functional groups such as carbonyl groups (e.g. amide groups are disfavored). Preferred Y and Y' groups include hydrogen and methyl groups to form blocks of oxyethylene with the structure —$(OCH_2CH_2)$— and oxypropylene with the structure —$(OCH(CH_3)CH_2)$—. Preferred species of include EO/PO tertiary amines conventionally used as nonionic defoamer surfactants as food & dairy cleaners. Commercial examples of such materials include Triton™ CF-32 from The Dow Chemical Company. Less preferred commercial examples including Jeffamines™ from the Huntsman Corp.

The present invention is useful in reducing silica scale formation in aqueous systems, such as by way of adding the anti-scalant to the water used in such systems. The amount of anti-scalant added to the water may vary depending upon the temperature and pH of the water along with the concentration of silica, salts and polyvalent metal ions present in the water. In most applications, an amount of from 1 ppm to 1000 ppm, and more preferably from 2 ppm to 100 ppm of the anti-scalant is added or maintained in the water used in the system. The feed water used in such systems typically has a silica content of more than 30 ppm, 50 ppm or even 100 ppm. Examples of applicable aqueous systems include boiler water systems, cooling water systems, evaporator systems, mining systems, geothermal systems, enhanced or tertiary oil recovery systems, paper manufacturing systems, gas scrubber water systems, laundry or and reverse osmosis systems.

In particular regard to a reverse osmosis system, the system includes a semi-permeable membrane module (e.g. spiral wound, hollow fiber, capillary and tubular membrane module or "element"). In a preferred embodiment, the membrane module comprises a spiral wound configuration including one or more reverse osmosis (RO) or nanofiltration (NF) membrane envelops and feed spacer sheets wound around a permeate collection tube. RO membranes used to form envelops are relatively impermeable to virtually all dissolved salts and typically reject more than about 95% of salts having monovalent ions such as sodium chloride. RO membranes also typically reject more than about 95% of inorganic molecules as well as organic molecules with molecular weights greater than approximately 100 Daltons. NF membranes are more permeable than RO membranes and typically reject less than about 95% of salts having monovalent ions while rejecting more than about 50% (and often more than 90%) of salts having divalent ions—depending upon the species of divalent ion. NF membranes also typically reject particles in the nanometer range as well as organic molecules having molecular weights greater than approximately 200 to 500 Daltons. For purposes of the present description, NF and RO are collectively referred to as "RO". In a conventional embodiment, one or more spiral wound elements are serially arranged within a pressure vessel. During operation pressurized feed liquid is introduced into the vessel and passes through the membrane element. The portion of feed water passing through the RO membrane produces a permeate stream having a reduced concentration of salts (and silica) with the remaining portion of feed water forming a reject stream having a higher concentration of salts (and silica). The feed water used in RO systems preferably has a pH less than 9.5, 9, or even 8.5 depending upon the specific application. Silica scale most commonly forms on the membrane surface as a result of silica concentration polarization. However, scaling may also occur along the entire reject stream due to increased silica content (i.e. the reject stream may have silica content of greater than 100 ppm or even 150 ppm). Such scaling is particularly pronounced when operating a reverse osmosis system at the pH values noted above when using feed water sources having a silica content of at greater than 30 ppm, 50 ppm or even 100 ppm. The addition of the subject anti-scalant is effective at inhibiting such scale formation allowing for improved performance (i.e. higher flux, higher recovery rates, less membrane cleaning and replacement, less pre-treatment, etc.).

The subject anti-scalants may be used in combination with other known anti-scalants, anti-coagulants and dispersants including but not limited to: polyacrylamides, acrylic acid and maleic acid polymers and copolymers, polyoxazoline, phosphonates and polyphosphates. One preferred combination is the subject anti-scalant with a known silicate and silica scale inhibitor, ACUMER™ 5000 (carboxylic multipolymer).

EXAMPLES

Example 1

In order to evaluate the efficacy of various anti-scalants, sample feed water samples were prepared by adjusting the pH of deionized water to 2-3 using HCl 0.81 g of sodium silicate was then added to the water to bring the $SiO_2$ concentration of to approximately 400 ppm. The pH of the solution was then adjusted to 4-5 by addition of HCl. Various anti-scalants were then added to samples of this test solution and the pH was slowly raised to approximately 8 at 25° C. while the solution was gently stirred and then allowed to stand for approximately 21 hours. The silica remaining in solution after 21 hrs is used as an indicator of the efficacy of the inhibitor for silica scale prevention. The percent silica scale inhibition is calculated as ppm of $SiO_2$ in solution after 21 hrs divided by initial i.e. 400 ppm $SiO_2$ and multiplied by 100. The results are summarized in Table 1. The total weight solids of anti-scalant added to each sample was constant. Selected copolymers are described in terms of weight ratios of individual monomers used during polymerization. (PEGMA=poly(ethylene glycol) methacrylate; AMPS=2-acrylamido-2-methylpropane sulfonic acid; AA=acrylic acid).

TABLE 1

| Anti-scalant | % SiO$_2$ polymer inhibition |
| --- | --- |
| Triton ™ CF-32 (EO/PO tert C$_{12\text{-}13}$ alkylamine) | 80 |
| Dowfax ™ DF-111 (alkyldiphenyloxide disulfonate) | 77.2 |
| Acumer ™ 5000/Triton ™ CF-32 (wt ratio: 17/83) | 77 |
| Dowfax ™ DF-147 (alkyldiphenyloxide disulfonate) | 75.9 |
| Dowfax ™ DF-122 (alkyldiphenyloxide disulfonate) | 75.0 |
| Dowfax ™ DF-142 (alkyldiphenyloxide disulfonate) | 74.5 |
| Dowfax ™ DF-101 (alkyldiphenyloxide disulfonate) | 70.8 |
| Tergitol ™ L62 (nonylphenolethoxylate) | 69.9 |
| Dowfax ™ 20A64 (alkyldiphenyloxide disulfonate) | 68.4 |
| 75 Vinyl Imidazole/25 PEGMA | 57.3 |
| 70 AA/10 AMPS/20 PEGMA 500 | 51.3 |
| 80AA/10AMPS/10PEGMA 500 | 51.1 |
| 80AA/10AMPS/10PEGMA 350 | 48.6 |
| Acumer ™ 5000 (carboxylic multipolymer) | 48.7 |
| PEG 600 (polyethylene glycol) | 47 |
| Control (no antiscalant) | 42 |

Example 2

To further evaluate the efficacy of various anti-scalants, several feed water samples were tested using an RO system. More specifically feed water samples were prepared using a stock solution of deionized water pH adjusted to 2-3 by addition of HCl. Individual feed samples were prepared from the stock solution by adding approximately 200 ppm SiO2 (added as sodium silicate pentahydrate). The pH of the feed samples was immediately adjusted to 4-5 by addition of HCl. 50 ppm of various anti-scalant where added along with 300 ppm Ca (added as calcium chloride dihydrate), 250 ppm Mg (added as magnesium chloride hexahydrate) and 150 ppm of bicarbonate (added as sodium bicarbonate). The pH of the samples was then adjusted to approximately 8 by addition of dilute NaOH. Individual feed samples were then pressurized to 100 psi at room temperature and passed through an RO module (FilmTec™ BW-XLE) with concentrate being recycled to the feed sample (correct). Permeate flux of RO module was monitored and normalized permeate flux is reported as a function of time in the plots shown as FIG. 1.

TABLE 2

| Legend used in FIG. 1 | Anti-scalant |
| --- | --- |
| —♦— | Triton ™ CF-32 |
| —■— | Acumer ™ 5000/Triton ™ CF-32 (wt ratio: 50/50) |
| —●— | Acumer ™ 5000 (Carboxylic multipolymer) |

TABLE 2-continued

| Legend used in FIG. 1 | Anti-scalant |
| --- | --- |
| —✳— | PEG 400 |
| ··▲·· | Jeffamine ™ D400 |

Many embodiments of the invention have been described and in some instances certain embodiments, selections, ranges, constituents, or other features have been characterized as being "preferred." Such designations of "preferred" features should in no way be interpreted as an essential or critical aspect of the invention.

The invention claimed is:

1. A method for inhibiting silica scale formation in an aqueous reverse osmosis system including a reverse osmosis membrane, wherein the method comprises the steps of:
    adding an anti-scalant to a source of feed water having a pH of less than 9.5 and containing silica, and
    passing the resulting feed water through the reverse osmosis system such that a portion passes through the reverse osmosis membrane to produce a permeate stream having a reduced concentration of silica with the remaining portion of feed water forming a reject stream having a higher concentration of silica;
    wherein the anti-scalant comprises a non-ionic, tertiary amine-terminated polyoxyalkylene represented by:

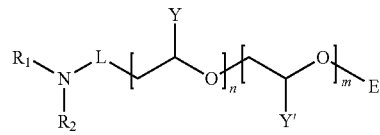

wherein Y and Y' are independently selected from hydrogen or alkyl; $R_1$ is a $C_1$ to $C_{20}$ hydrocarbon moiety: $R_2$ is a $C_{10}$ to $C_{14}$ hydrocarbon moiety; and E is a terminal end group selected from hydrogen, alkyl, $NR_1R_2$; L is a linking group selected from a direct bond between the oxyalkylene repeating unit —(CH$_2$CH(Y)O)— and the nitrogen atom, or a $C_1$ to $C_{20}$ hydrocarbon moiety; n is an integer from 2 to 1000; and m is an integer from 0 to 1000.

2. The method of claim 1 wherein the anti-scalant has a Mw of 100 to 100,000 Daltons.

3. The method of claim 1 wherein the feed water has a pH less than 9 and a silica content of at least 30 ppm, and wherein the reject stream has a silica content of at least 100 ppm.

4. The method of claim 1 wherein from 1 to 1000 ppm of the anti-scalant is added to the water of the aqueous system.

* * * * *